Patented Mar. 10, 1925.

1,529,056

UNITED STATES PATENT OFFICE.

CARLETON ELLIS, OF MONTCLAIR, NEW JERSEY.

ARTICLE SURFACED WITH NITROCELLULOSE AND SYNTHETIC-RESIN COATINGS AND PROCESS OF MAKING SAME.

No Drawing.   Application filed January 4, 1924. Serial No. 684,359.   REISSUED

*To all whom it may concern:*

Be it known that I, CARLETON ELLIS, a citizen of the United States, and a resident of Montclair, in the county of Essex and State of New Jersey, have invented certain new and useful Improvements in Articles Surfaced with Nitrocellulose and Synthetic-Resin Coatings and Processes of Making Same, of which the following is a specification.

This invention relates to articles such as sheet metal surfaced with coatings containing nitrocellulose and a synthetic resin or resins as essential constituents and to the process of making same and relates especially to sheet metal having one or more surfaces coated with compositions of the character hereinafter specified.

Automobile metal bodies, metal furniture and other objects or articles of sheet aluminum, steel, copper, brass and the like bearing a protective or ornamental coating comprising nitrocellulose and a compatible synthetic resin fall within the purview of the present invention.

The invention will be illustrated more particularly with respect to its application in the automobile industry. The painting of automobile bodies with a durable coating has long been a problem. Automobile bodies, being exposed to sun and rain usually present a dilapidated appearance after a season's use. A durable surface for exposed body parts is much desired.

One object of the present invention is to achieve a high degree of durability for coated metal by the use of relatively cheap and available materials.

In the exterior finish of an automobile body there is required a certain degree of hardness to resist abrasion coupled with toughness and elasticity. Furthermore the coating must adhere tenaciously so as not to chip or scale off when handled roughly. A marked degree of resistance to light and moisture and all weather conditions is important.

Nitrocellulose coatings of themselves often do not adhere well to metal especially when the coated surface is kept wet for some time. The nitrocellulose film has a tendency to strip and peel.

In the present invention this tendency is minimized by the employment with nitrocellulose of a synthetic resin compatible therewith. The synthetic resin acts not only as an agent to confer greater adherence but also increases the total binder solids thereby giving greater substance and producing a more effective finish. The surface finish, whether intentionally dull or lustrous, should have a quality of smoothness which results only when sufficient binding agent is present to cement or bind together the particles of pigment.

There are very definite limits to the solubility of nitrocellulose. The same is true of the natural resins. Furthermore some of the natural gums or resins are by no means compatible with nitrocellulose. Only a restricted number of the natural resins are appropriate for compounding with nitrocellulose and the supply of these natural resins is limited or the market prices thereon are subject to considerable fluctuation which is disadvantageous from a manufacturing standpoint. On the other hand there are a number of synthetic resins, which, according to the present invention, may be used without the restrictions or disturbances imposed in using the natural resins, which is a condition of affairs highly advantageous. Furthermore the cost of manufacture of such synthetic resins generally speaking is not subject to great variation due to violent fluctuations in the cost of raw materials.

The following paragraphs denoted by numerals indicate some of the considerations, conditions and requirements involved in connection with the present invention.

1. *Consistency of the coating composition.*—The consistency should be such that the composition can be applied by means of a brush or a spraying device. If applied by the former method the composition should dry slowly enough to not show brush marks. It should work freely under the brush. This depends in part on the proportion of solvents and their degree of volatility. A quicker drying medium may be used for application by spraying.

2. *Quick drying.*—In any event the quality of quick-drying generally is very important as this feature allows several coats to be applied in a day. With a quick-drying material articles may be moved through the paint department rapidly and less space therefore is required for the operation.

3. *Sand papering.*—The surface should be capable of being sand papered soon after application, without gumming of the sand paper.

4. *Avoidance of precipitation.*—There should be no precipitation during drying due to a change in the proportion of solvent by differences in the rate of evaporation. The solvent employed is usually composite and the components thereof should be selected and adjusted to prevent any precipitation or coagulation during the drying period.

5. *Water elimination.*—In the preferred form of coating material water should not be present. This may be secured by care in the selection of the raw materials and especially by the use of anhydrous solvents. If water is present a high boiling solvent or water-eliminant preferably is added. This solvent should exert its solvent effect not only on the nitrocellulose but also on the synthetic resin during the stage of drying when water is being expelled.

6. *Total solids.*—The coating composition preferably should have a high content of total solids, preferably 50 per cent or more, in order that each application of a coat will leave on drying a substantial film. Since solvents or thinners represent a loss as they are used only to render the composition liquid for application the percentage of solvents or thinners should be kept as low as possible consistent with ease of application. Expensive solvents usually are not feasible as the cost of manufacture should be kept low.

7. *Pigments.*—There is a direct connection or co-operative effect existing between pigment and binder. Films of nitrocellulose and synthetic resins suitably incorporated with pigment are more durable and resistant than the unextended film. The pigment should be compatible with nitrocellulose and not be of an acid character such as would tend to impair the stability of the nitrocellulose to an objectionable degree. If stabilizers of a basic character are used in the nitrocellulose the pigment should not have any action on these. Also the pigment should not produce any thickening or livering effects with the synthetic resin employed. Mineral colors such as ochre, umber, iron oxide or mineral red, various lakes and the like may be used. White pigments may be employed for making enamels. It is important to have the pigment finely divided and it is best to grind the pigment either with the solvents or the solution in the solvents of either the nitrocellulose or the synthetic resin or both.

8. *Synthetic resin.*—This material must be compatible or blend adequately with nitrocellulose, as the composition dries the resin should "colloid" well with the nitrocellulose. Furthermore the resin should be soluble in solvents appropriate for nitrocellulose including any high boiling solvents used as water eliminants, which solvents are generally last to leave the coating. Even though the solid constituents blend in the original solution separation may occur as the solvents evaporate due to changing composition. This should not occur and the ratio of one solvent to another in evaporation of a composite solvent preferably should be such as will at all times accommodate and promote a colloidal blend of the nitrocellulose and synthetic resin.

If nitrocellulose is incorporated with an incompatible resin in a suitable solvent mixture the liquid especially if very viscous may dry without segregation. In the solid film which forms the incompatible constituents will however be in a state of tension or stress and aggregation, yielding a brittle product, will result on standing especially under the action of light and moisture. Such a coating possesses very little durability. Synthetic resins having, like camphor, a slight affinity for nitrocellulose are preferable.

9. *Proportion of resin.*—If a small proportion of synthetic resin with respect to nitrocellulose is used the character of the resin may be quite soft. Its effect on the nitrocellulose will be to render the latter more flexible. In other words it acts also as a softening agent. Nitrocellulose will however take up or assimilate only a moderate amount of such a soft material without detriment to its other properties. A high proportion of soft resin has too great a softening effect and harder resins should be employed in this case. As a general rule the hardness of the resin preferably should increase with the proportion employed. In some cases a soft resin may be used for softening purposes, coupled with a hard resin as an extending binder in order to secure the desired physical properties. In the present invention I preferably employ the synthetic resin in considerable proportion: for example in an amount at least equal to the nitrocellulose and in some cases in the ratio of up to two parts of synthetic resin to one part of nitrocellulose or even in higher proportions.

10. *Color of the synthetic resin.*—This depends on the color of the coating material desired. White or colorless synthetic resins should be used for very light colored coatings, while red, brown or black synthetic resins may be used for darker colored coatings.

11. *Solubility.*—As noted the synthetic resin should be soluble in solvents appropriate for nitrocellulose. For example acetone, various alcohols, ethyl acetate, amyl acetate and the like and mixtures of these with benzol, &c.

12. *Stability of resin on exposure.* Preferably the synthetic resin should show good resistance to weathering influences. It appears however that the synthetic resin and nitrocellulose may supplement each other so that when mixed the durability of the resulting coating is greater than that of either employed singly. For inside application, for example on furniture, the coating may of course be less durable.

13. *Livering.*—The synthetic resin should not possess an acid nature when used with basic pigments such as zinc oxide or white lead and react with these pigments to cause objectionable thickening so that the coating becomes difficult to apply.

14. *Nitrocellulose.*—The toughness and elasticity of nitrocellulose are desired in the coating in a pre-eminent way therefore the maximum amount of nitrocellulose which can be incorporated without making a solution so viscous that it cannot be readily applied should be an objective. A low-viscosity nitrocellulose preferably is used in order to secure the maximum proportion of this substance consistent with ease of application. Nitrocelluloses such as gun cotton and the like forming highly viscous solutions therefore are not as desirable. Ordinary nitrocellulose of the type known as soluble cotton may be used. Cotton which has been exposed to heat at a temperature above 100° C. and having thereby a greatly diminished viscosity is especially useful. The cheapest stock for making the coating probably is celluloid scrap. Moving picture film or other white scrap may be used for light coatings, and tortoise shell comb cuttings and dust and the like used for darker colors. Celluloid scrap may be renderel low in viscosity by heating to 120–130° C. in a solution of calcium chloride for an hour or two; or by dry heating at between 100 and 130° C. Since the use of low-viscosity nitrocellulose or celluloid forms a feature of the preferred embodiment of the present invention further details will be hereinafter given.

15. *Stabilizers.*—Urea and its derivatives, amines, magnesium lactate and the like may be used as stabilizers. Zinc oxide, whiting and other basic pigments act as stabilizers. Celluloid ordinarily contains a stabilizer.

16. *Dehydration.*—Soluble cotton containing 5 per cent or so of water may be dried before use. A bone-dry product reduces the amount of relatively costly water-eliminants.

17. *Softeners.*—The purpose of using softeners is to prevent brittleness. A variety of substances may be employed which are compatible with nitrocellulose and the synthetic resins employed. Softeners include castor oil, nitrated castor oil, certain boiled and blown oils such for example as blown rape oil, camphor, camphor acetate; diethyl phthalate, acetanilide, triacetin, triphenyl and tricresyl phosphates. For best results the softener should be entirely compatible both with the nitrocellulose and the synthetic resin.

18. *Natural resins.*—The addition of natural resins such as dammar or shellac, congo, copal and the like is not precluded. A proportion in excess of the amount of synthetic resin simultaneously employed is not usually desirable. Natural resins are too inflexible in their physical properties to be readily adjustable to meet the conditions of the present invention and their use is preferably confined to the status of moderate additions.

19. *Miscellaneous ingredients.*—Other substances which may be used to a greater or less degree include cellulose acetate, cellulose ethers and the like. Also fire retardants may be added including various chlorinated solids and appropriate mineral salts. When the coating is to be used on wooden surfaces the inflammability preferably is reduced to the lowest point practicable.

20. *Solvents.*—As stated these are usually composite and a typical one consists of three components, (*a*) A highly volatile liquid which is a good solvent for nitrocellulose (*b*) A slowly volatile solvent which is a good solvent for nitrocellulose and which serves as a water-eliminant (*c*) A volatile non-solvent employed as a cheapening agent.

Under group (*a*) are included such solvents as acetone, methyl acetone, methyl ethyl ketone, methyl and ethyl acetate, various ethers and ethyl formate. Methyl and ethyl alcohol are not good solvents and are best used with one or more of the foregoing active solvents.

Under group (*b*) butyl and amyl alcohol, amyl acetate, diacetone alcohol, ethyl carbonate and the like are included as high boiling solvents or water eliminants. Furfural may be used to advantage. Furfural is a very active solvent for most forms of nitrocellulose but is especially useful in preparing solutions made from low-viscosity nitrocellulose, particularly those products which have been reduced in viscosity by special heat treatment. Furfural is usually dark in color and it is resinified by acids. Therefore in using furfural some mildly basic material advantageously may be present to stabilize the solution and prevent the formation of acids which would affect the furfural. Also it is best to employ furfural only in the preparation of darker colored coatings.

(*c*) In this group benzol is probably the most important solvent. Light coal tar distillate, toluol and xylol and solvent naptha also may be used in some cases. Preferably however the non-solvent should be very readily volatile as it is undesirable to have too great a concentration of non-solvent in the coating during drying. Carbon tetrachloride, trichlorethylene and petroleum spirits sometimes may be employed. Benzol is far preferable to petroleum spirits as it does not coagulate nitrocellulose nearly as readily as the petroleum spirits. This enables a greater proportion of benzol to be used in the composition than is the case when petroleum spirits is used as a substitute. The class (c) solvents usually are substantially free from water. They are valuable either because they act as resin solvents or because when admixed with alcohol or acetone they afford a solvent mixture which dissolves many synthetic resins very freely.

Sometimes solvents of the group (c) type are omitted entirely for various reasons such as modification of viscosity or increase in the quantity of synthetic resin etc.

21. *Anhydrous conditions.*—The presence of water in small amounts causes blushing on drying and unless a water-eliminant is present a white film lacking in strength results. It is very desirable that water be eliminated before all the solvent for the nitrocellulose and synthetic resin evaporates. Soluble cotton shipped in a wet state preferably should be dried before use. Also it is possible to employ anhydrous ethyl acetate, anhydrous ethyl alcohol and other solvents such as acetone in the dry state which is desirable. The solvent mixture may be prepared and dried by treatment with calcium carbide, quick lime and the like or by boiling with magnesium powder. Dry nitrocellulose and anhydrous solvents of a highly volatile character reduce the amount of or render unnecessary the use of the more costly highly boiling solvents. In any event a lesser amount of the latter is generally required in the winter season when the air is dry. In a humid climate the amount of high boiling solvents may be increased to correspond to the conditions.

22. *Varnishes.*—Lacquers made from nitrocellulose usually have a high proportion of solvents. Varnishes made in accordance with the present invention are preferably produced with the aid of heat treated low-viscosity nitrocellulose in conjunction with a fairly high proportion of synthetic resins in order to raise the total solids to as high a degree as possible. Preferably the total solids should be from 30 to 60 per cent. The addition of dyes soluble in the solvents employed but preferably water-insoluble serves to make varnish stains.

23. *Use of a priming coat.*—The surface preferably is primed with an oil-primer such as is used in ordinary painting operations as a first coat. Such a primer is especially desirable on metal to assist in adhesion. Nitrocellulose coatings of themselves as noted have low adhesive properties. An oil-primer or a primer of a character substantially dissimilar to that of the outer coatings preferably is used.

It may be noted that the surface, if of steel or other metal, first may be cleaned by sand-blasting or treatment with some solvent or cleaning liquid e. g. a solution of phosphoric acid in alcohol. The surface may be scoured with steel wool and washed with hot water.

After cleaning the surface a red oxide primer or other suitable oil-primer is applied and may be exposed to a temperature of 150° C. for 1 to 2 hours to cause rapid and thorough drying. The automobile body or whatever metallic surface is being treated may be putty glazed and coated with a sand surfacer. The latter likewise may be baked at about 150° C. for and hour or more. These coatings serve to form a good under-finish or foundation which can be rubbed to a smooth surface by sand papering. After sanding the surface is washed with water.

When applying the coating to wooden surfaces an oil-primer may be used as above and a second or intermediate coat of some composition which has good sealing properties may be applied over the primer, for example a shellac mixture may be used. On wood there is a tendency sometimes for the nitrocellulose synthetic resin composition to sink through the primer which causes the surface to become dull. The application of an intermediate sealing coat therefore is desirable under these conditions. It is not absolutely necessary that the primer used be free from nitrocellulose nor that it be simply an oil-primer. In some cases a synthetic resin priming coat may be employed.

24. *Applying nitrocellulose-synthetic resin coating.*—Surface now in readiness to receive the nitrocelluluose synthetic resin coatings. These may be applied with brush or air-gun. After applying a coating the latter may be exposed to a temperature of 50 C. for half an hour. A second coat is applied and similarly dried. The finish then is rubbed with boiled linseed oil and rotten stone and if desired may be given a wax finish or polish (carnauba or candelila wax). If two coats are not adequate an additional number may be applied.

The following indicate various compositions illustrative of the present invention.

Example 1.

Low-viscosity nitrocellulose, 5 parts by weight.
Phthalic glyceride rosin ester, 5 parts.
Blown rape oil, 7 parts.
Prussian blue, 1⅓ parts (and upwards).
Composite solvent, 60 parts.

The low-viscosity nitrocellulose referred to in the foregoing formula has been heat-treated to render its viscosity as low as possible and its solubility high. The composite solvent is made from 7 parts denatured alcohol, 28 parts ethyl acetate, 45 parts butyl alcohol, 20 parts amyl acetate. It will be noted that this solvent does not contain any benzol. The synthetic resin is made as follows: 35 parts by weight of glycerine, 134 parts of common rosin and 31 parts of phthalic anhydride are mixed and heated under a reflux condenser until a temperature of 270° C. is reached. The condenser is of such length that the water formed by the reaction escapes while glycerine is retained.

*Example 2.*

Moving picture film is boiled in water, preferably somewhat alkaline to remove the emulsion and the stripped material is heated to 160° C. for 2 to 5 seconds. This heat-treatment effects a remarkable reduction in viscosity which expressed in a comparative way is indicated by the fact that a solution of the untreated celluloid film had a viscosity represented by 24 minutes while a solution made from the heat-treated product exhibited a viscosity of about 45 seconds.

2.7 parts by weight of phthalic anhydride and 1 part of glycerine were heated together to a temperature of about 230° C. When the temperature reached this point the heating was discontinued as further heating is liable to bring about the formation of an insoluble product. A soluble resin was obtained which was incorporated with the heat-treated celluloid film obtained as above.

Proportions used were 2 parts by weight of the heat-treated film to 4.8 parts phthalic glyceride resin. These components were dissolved in 8 parts of a composite solvent made up of 2 parts furfural, 1 part ethyl acetate, 3 parts acetone and 2 parts benzol. On drying a brownish film was obtained which showed no segregation, under the microscope, and which was hard and tough. To the foregoing various softeners such for example as those previously described and the requisite quantity of a suitable pigment may be added. The pigment should be ground in the solvent solution or in a mixture to secure the best spreading qualities.

The various methods of producing nitrocellulose of low-viscosity by heat treatment have been set forth in my patent application, Serial No. 682,553. The disaggregation or depolymerization of nitrocellulose by such heat-treatment to produce low-viscosity material is of special value in connection with the use of furfural as a solvent. It may be noted that commercial furfural may contain water which will separate and cause turbidity on the addition of benzol. This may be cleared by the addition of acetone or alcohol. Commercial furfural after standing for some time will on drying usually leave a brownish resinous substance of considerable hardness. This substance has a greater tendency to form on baking so that a cementing action is effected by the use of furfural which perhaps may be compared in some respects with the oxidation of turpentine in ordinary paint. Furfural is used in a composite solvent for low-viscosity nitrocellulose in the proportion of preferably 10 to 30 per cent of the total solvents, the balance being highly volatile solvents such as acetone, ethyl acetate, alcohol, benzol and the like.

Furthermore it may be noted that the addition of benzol to such low-viscosity solutions tends to increase the viscosity somewhat and when the lowest degree of viscosity is required benzol and similar non-solvent preferably should be avoided and acetone, ethyl acetate and the like used instead.

*Example 3.*

30 parts by weight of toluidine and a like amount of tung oil are heated with 6 parts of zinc chloride dissolved in 5 parts of water. The heating is carried out in a flask open or arranged with an ordinary condenser to carry off vapors without refluxing action, temperature being raised to 285° C. producing a reddish resin. Equal parts of this resin and low-viscosity soluble cotton were dissolved in acetone to produce a solution of 20 per cent strength and upwards. The solutions were low in viscosity and on drying formed yellow to brown films which were very flexible. The toluidine-tung oil resin has a very useful softening action as well as furnishing a resinous extending constituent. The films were bright and clear with a good gloss and without any indications of segregation when subjected to microscopic examination.

To compositions of this character a dye of an appropriate shade may be added to produce a varnish stain, or a finely ground pigment may be introduced. Thus one may prepare stains or paints of for example a mahogany color intended for coating the steel interiors of railway coaches to yield an imitation of mahogany wood. A thorough baking is desirable with this type of resin. A coated metal product within the purview of the present invention thus is obtained.

*Example 4.*

1 part of nitrocellulose film, rendered low in viscosity by heating a few minutes to 160° C. as described in the foregoing, 2 parts of resin made from toluidine and tung oil as described above, 2½ to 3 parts of acetone and ½ to 1 part of furfural, the proportions being by weight, yields a heavy-bodied liquid from which a varnish, paint or stain can be made in accordance with the foregoing.

*Example 5.*

Equal parts of furfural and aniline are heated for 1 hour at 200° C. yielding a dark brown to black resin. 4.8 parts by weight of this resin and 2 parts of celluloid film, rendered low in viscosity by heating at 160° C. as described above, were incorporated with a mixed solvent composed of 2 parts by weight of furfural to 1 part of ethyl acetate, 3 parts of acetone and 2 parts of benzol. This yielded a composition which although liquid was too heavy to be applied by brushing or spraying and required the addition of a thinner to yield a consistency adapted for addition of pigments and the like. The films obtained or coatings produced were very dark in color hence the composition is adapted only for producing coatings in the darker shades.

The composition herein disclosed is claimed in my copending application Serial No. 684,358, of even date herewith.

What I claim is:—

1. Sheet metal carrying a tightly-adhering coating containing nitrocellulose and a synthetic resin compatible therewith.

2. A process which comprises applying to sheet metal an oil-primer as an anchoring coating, allowing to dry and applying thereto a plurality of coats of a composition containing nitrocellulose and a synthetic resin compatible therewith.

3. Sheet metal carrying a primer and a coating containing nitrocellulose and a synthetic resin compatible therewith.

4. Sheet metal carrying a coating containing nitrocellulose, a synthetic resin compatible therewith, and a natural resin.

5. Sheet metal carrying a coating containing nitrocellulose, a synthetic resin compatible therewith, and a pigment.

CARLETON ELLIS.